March 7, 1950 — S. J. WALKER — 2,499,549
RAILWAY BRAKE BEAM SUPPORT STRUCTURE
Filed March 15, 1947 — 3 Sheets-Sheet 1

INVENTOR:
SAMUEL J. WALKER
BY Rodney Bedell
ATTORNEY.

March 7, 1950  S. J. WALKER  2,499,549
RAILWAY BRAKE BEAM SUPPORT STRUCTURE
Filed March 15, 1947  3 Sheets-Sheet 2

INVENTOR:
SAMUEL J. WALKER
BY Rodney Bedell
ATTORNEY.

March 7, 1950     S. J. WALKER     2,499,549
RAILWAY BRAKE BEAM SUPPORT STRUCTURE Filed March 15, 1947     3 Sheets-Sheet 3

INVENTOR:
SAMUEL J. WALKER

Patented Mar. 7, 1950

2,499,549

UNITED STATES PATENT OFFICE 2,499,549

RAILWAY BRAKE BEAM SUPPORT STRUCTURE

Samuel J. Walker, Lake Forest, Ill., assignor to Chicago Railway Equipment Company, Chicago, Ill., a corporation of Illinois Application March 15, 1947, Serial No. 735,006

16 Claims. (Cl. 188—212)

The invention relates to the supporting of a railway truck brake beam upon the side frames of the truck.

It is a practice to support the brake beam at its ends by brackets on the truck side frames on which the brake beam slides to and from the truck wheels during application and release of the brakes. Usually the ends of the beam and the cooperating brackets on the side frames are received one within the other to hold the beam against tilting about its longitudinal axis. If the side frames tilt lengthwise of the truck or move vertically relative to one another during movement of the truck, the brackets at opposite sides of the truck become misaligned and the brake beam structure is put under severe torsion or shear which may cause the compression member, tension rod, or beam ends to break. Furthermore, when the brackets are misaligned, the beam ends bind on the brackets and the brake beam no longer slides freely to and from the truck wheels during application and release of the brakes, thereby putting a further strain on the beam.

Lengthwise tilting of the side frames is aggravated by non-uniformly worn wheel treads, journals, journal bearings and wedges, or by variations in wheel diameters and in side frames. Relative vertical movement of the side frames may occur when the truck passes over track where the rails are uneven or rounds a curve where the outer rail is higher than the inside rail to compensate for centrifugal force at high speeds.

The main object of the present invention is to overcome the above indicated disadvantages of brake beam supports of the kind referred to by mounting the beam at one or both of its ends on supports which accommodate relative angular movement of the side frames and brake beam when the side frames tilt or move vertically relative to one another, without undue strain in the parts.

A more specific object of the invention is to obtain the desired result by providing yielding elements between the beam and supporting brackets. The elements are resistant enough to guide the beam on the brackets and yield only when excessive forces are exerted on the beam. With this arrangement, relative angular movement between the side frames and the beam about the beam axis relieves torsion on the beam. Likewise, angular movement of the beam about its ends relative to the side frames relieves shear forces on the beam.

Another object of the invention is to yieldingly support the brake beam at its ends to dissipate shocks to the brake beam structure such as may be caused by rough track or application of the brakes.

Other objects will be apparent to those skilled in the art from the following description and accompanying drawings, in which—

Figure 8:
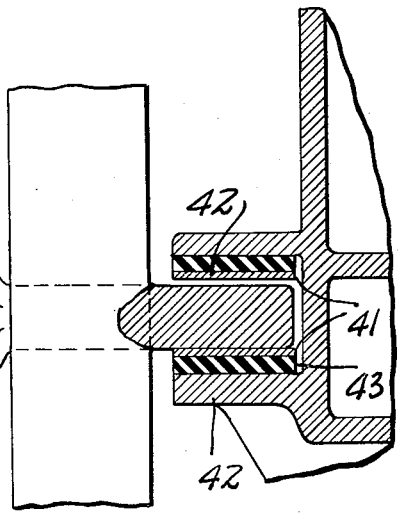
Figure 9:
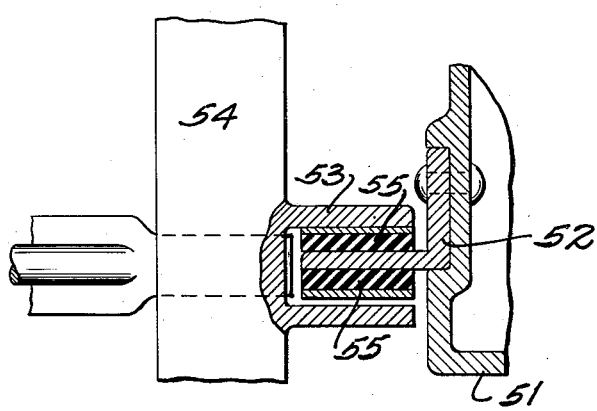
Figure 10:
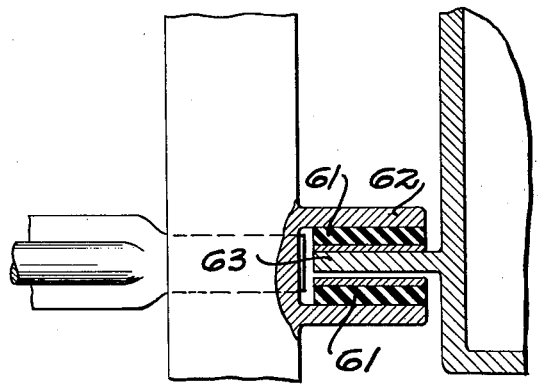

Figures 9 and 10 correspond generally to Figure 8 but show other forms of the invention.

Figure 1:
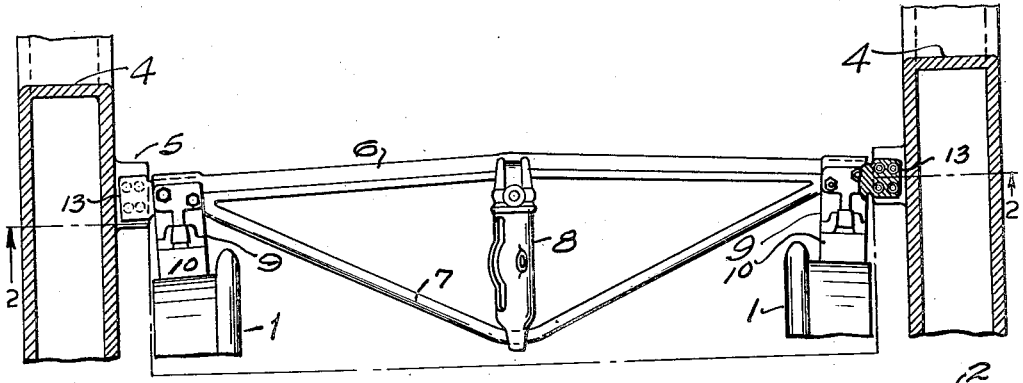
Figure 1 is a top view of a truss type brake beam showing the same applied to the wheels of a truck and showing the truck side frames and right hand end of the beam in horizontal section as indicated by the section line 1—1 in Figure 3.
Figure 2:
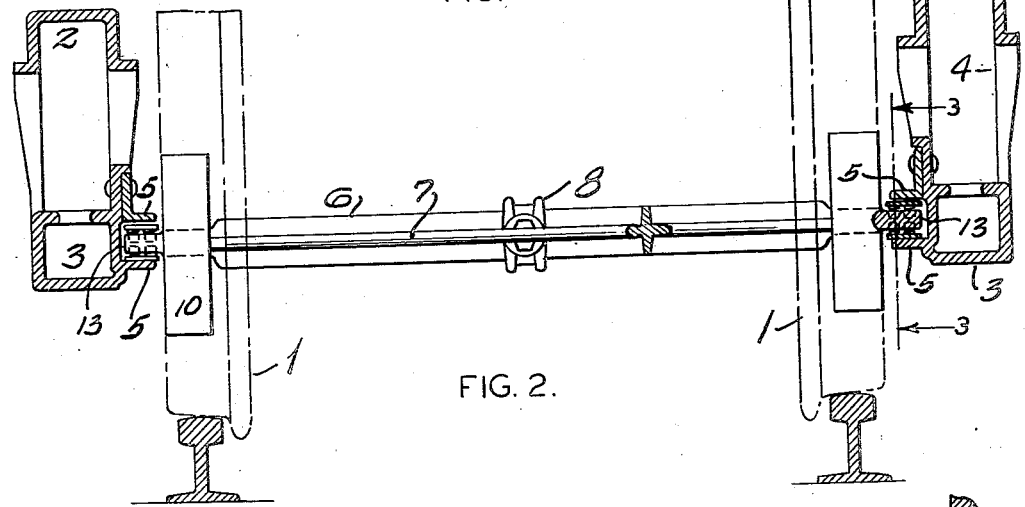
Figure 2 is a front view of the brake beam showing the same applied to the truck wheels indicated in broken lines and showing the truck side frames and right hand beam end structure sectioned vertically as indicated by the line 2—2 in Figure 1.
Figure 3:
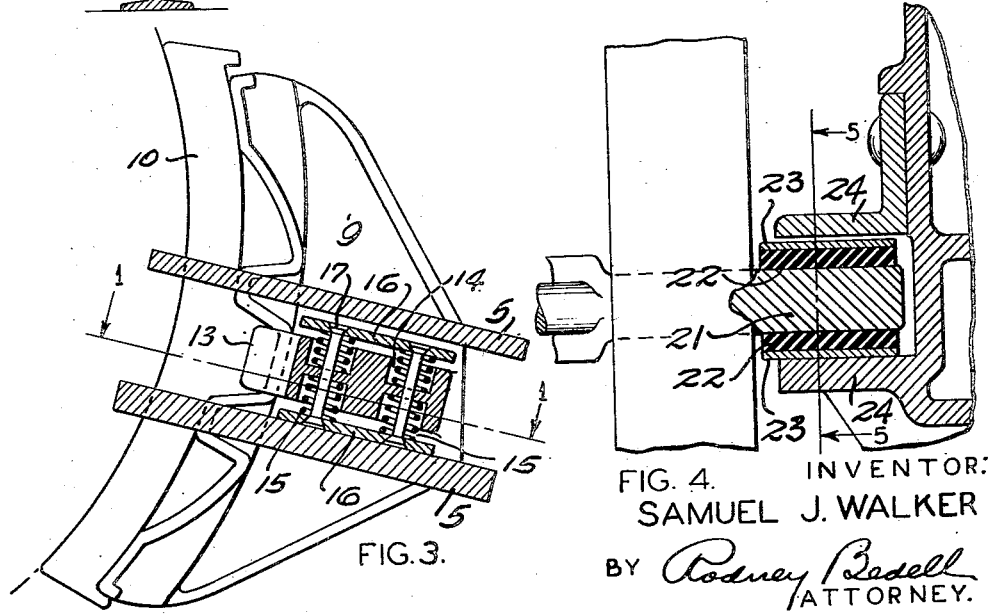
Figure 3 is a detail vertical section longitudinally of the truck drawn to enlarged scale and taken approximately on the line 3—3 of Figure 2.

In Figures 1–3, the truck wheels are indicated at 1 and it will be understood that these wheels are mounted upon the usual axles with the journal boxes (not shown) which carry the truck side frames of truss type, each including a top chord 2, a bottom chord 3 and spaced columns 4. Each side frame is provided with a pair of spaced parallel inwardly extending brackets 5 forming a guideway therebetween.

A brake beam extends transversely of the truck between the side frames and preferably is of the truss type including an elongated compression member 6, an elongated tension member 7, a strut 8 and brake heads 9, each equipped with a shoe 10 and attached rigidly to the ends of the elongated members 6, 7.

At each end of the brake beam is an element 13 rigid with the beam and extending outwardly of the brake head between brackets 5. Element 13 is yieldingly supported between spaced wear plates 16 by compression springs 15 seated in recesses 14. Rivets 17 coaxial with springs 15 maintain assembly of element 13, wear plates 16 and springs 15 and limit movement of the wear plates away from each other.

The overall width from the outer face of one wear plate 16 to the outer face of the other preferably is less than the distance between adjacent brackets 5 so that the beam end may slide freely between the brackets as the beam moves to and from wheel engaging position.

When the side frames tilt lengthwise relative to one another about a transverse axis, instead of the beam being twisted about its longitudinal axis beam elements 16 may incline relative to the beam axis and maintain the elongated flat sliding contacts between the beam and the brackets. When the side frames move vertically relative to one another, or if they should incline transversely of the truck from the vertical, thus varying the angle between the beam and the side frames, beam elements 16 may incline relative to the remainder of the beam and maintain the elongated flat sliding contacts between the beam and the brackets. In other words, beam elements 16 are substantially parallel to the opposing surfaces of brackets 5 at all times, irrespective of the relative positions of the side frames and brake beam.

Figure 4:
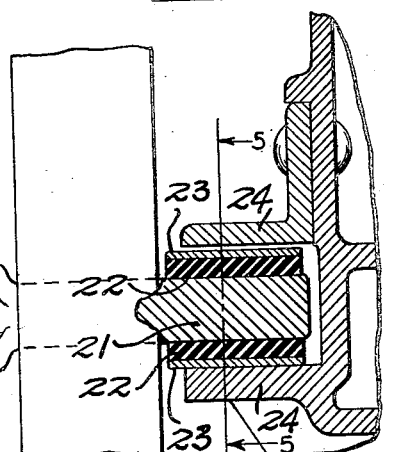
Figure 4 is a detail vertical section transversely of the truck of the right hand end of a brake beam and adjacent side frame showing another form of the invention.
Figure 5:
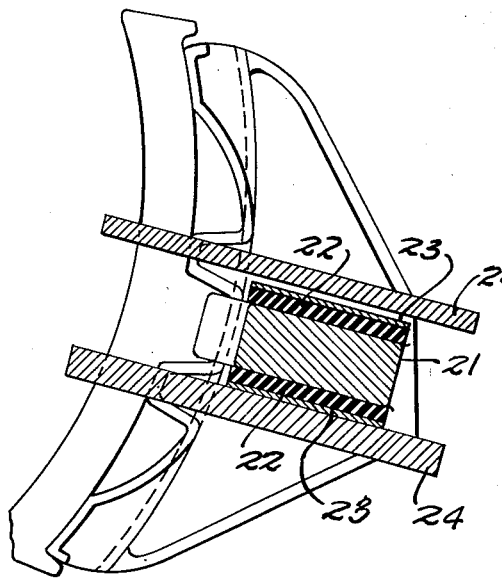
Figure 5 is a detail vertical section longitudinally of the truck taken approximately on the line 5—5 of Figure 4.

Figures 4 and 5 show a yielding support for the brake beam which may be substituted at each end of the beam for the structure shown in Figures 1–3. An element 21, rigid with the beam, extends outwardly of the brake head and is yieldingly supported by pads 22, preferably of rubber, between spaced wear plates 23 slidingly received between brackets 24 on the side frame. The pads are bonded to element 21 and to wear plates 23. Pads 22 yield when the side frames tilt lengthwise or move vertically relative to one another to provide for angular movement of the beam relative to the side frames to relieve the beam from excessive torsion and shear forces.

Figure 6:
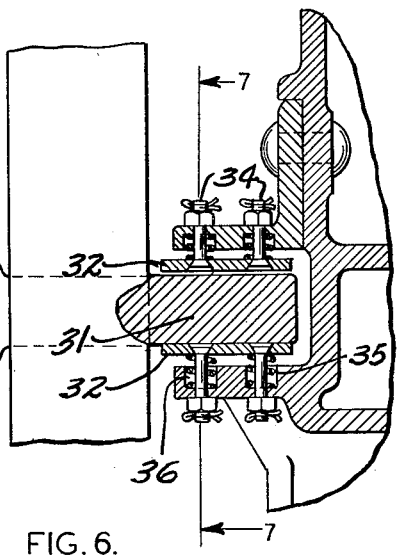
Figures 6 and 8 are views similar to Figure 4 and show other forms of the invention.
Figure 7:
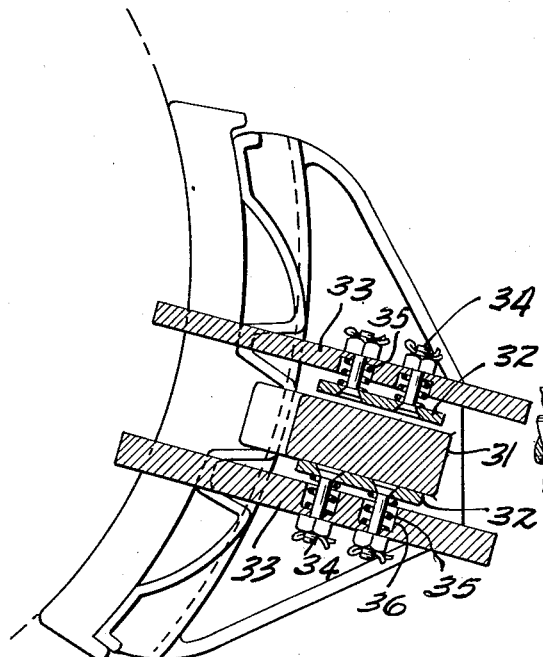
Figure 7 is a detail vertical section longitudinally of the truck taken approximately on the line 7—7 of Figure 6.

Figures 6 and 7 show an outwardly extending element 31 rigid with the brake beam and loosely received between wear plates 32 so that the element may slide freely therebetween. Wear plates 32 are mounted on bolts 34 attached to brackets 33 on the side frame. Wear plates 32 are urged toward one another by springs 35 coaxial with bolts 34 and seated in recesses 36 in brackets 33.

The distance between adjacent faces of wear plates 32 is determined by bolts 34. Springs 35 yield to accommodate relative lengthwise tilting or vertical movement of the side frames without torsion or bending forces on the brake beam.

The embodiment shown in Figure 8 is similar to the embodiment in Figure 4 except that wear plates 41 are yieldingly mounted on brackets 42 on the side frame by pads 43, preferably rubber-like material, bonded to the wear plates and brackets. Pads 43 yield when the side frames tilt or move vertically relative to one another and relieve the brake beam from torsion and bending forces. This figure shows both brackets 42 integral with the side frame, a modification of the bracket structure which may be incorporated in any of the other forms of the invention.

In each of the arrangements described above, a single element projects from the beam and is received between vertically spaced guides on the truck frame. Figures 9 and 10 show this relation reversed. In Figure 9 a truck side frame 51 has an angle bracket 52 secured to it and the horizontal flange of the angle is received between vertically spaced flanges 53 integral with the brake beam head 54. Pads 55 of rubber-like material are each bonded at one side to a face of the horizontal leg of the angle and has a wear plate 56 bonded to its other side to oppose the brake head flange.

In Figure 10, the arrangement of parts is similar but the yielding elements 61 are applied to the beam. The wear plates 62 oppose the supporting bracket flange 63 and the latter is shown integral with the side frame 64.

The details of the construction may be varied otherwise substantially without departing from the spirit of the invention, and the exclusive use of those modifications coming within the scope of the claims is contemplated.

What is claimed is:

1. In a railway brake arrangement including truck side frames and a brake beam, slidably interengaging means on each side frame and the adjacent end of the brake beam forming the sole support of the brake beam, said means including spring-like structure accommodating relative angular movement of the beam and side frames about the longitudinal axis of the beam.

2. In a railway brake arrangement, wheels, support brackets provided with guide means, a brake beam including heads and shoes for application to said wheels, and means at the ends of the beam outwardly of said heads yieldingly supporting said brake beam from said support brackets.

3. In a railway brake arrangement wheels, spaced side frames provided with guide means, a brake beam including heads and shoes for application to said wheels, and springs at the ends of the beam outwardly of said heads yieldingly supporting the brake beam from said guide means and to provide for angular movement of said beam relative to said side frames to relieve torsion and shear forces on the beam when said side frames tilt angularly or move vertically relative to one another.

4. In a railway brake arrangement, wheels, spaced side frames provided with guide means, a brake beam including heads and shoes for application to said wheels, and an extension cooperating with said guide means to support the brake beam, said guide means and extension being elongated in the direction of the beam movement, and yielding pads between said extension and guide means throughout their interengaging area.

5. In a railway truck, wheels, side frames provided with inwardly extending elements, a brake beam including heads and shoes for application to said wheels, said brake beam having outwardly extending elements at its ends cooperating with said side frame elements to slidingly support the beam for movement to and from wheel engaging position, and a wear plate yieldingly mounted on at least one of said elements at each side of the truck and opposing the other element to provide yielding movement between said elements.

6. In a railway brake arrangement, wheels, side frames provided with pairs of inwardly extending substantially parallel brackets forming guideways therebetween, a brake beam including heads and shoes for application to said wheels, said brake beam having outward extensions at its ends received in said guideways, and wear plates yieldingly mounted on said extensions and slidable between said brackets.

7. In a railway brake arrangement, wheels, spaced side frames provided with pairs of inwardly extending substantially parallel brackets forming guideways therebetween, a brake beam including heads and shoes for application to said wheels, said brake beam having outward extensions at its ends received in said guideways, the faces of said extensions adjacent said brackets being recessed, springs in said recesses, and wear plates mounted on said springs and slidably engaging said brackets, there being means to limit movement of said wear plates away from said extension.

8. In a railway brake arrangement, wheels, a side frame provided with a pair of inwardly extending substantially parallel brackets providing a guideway therebetween, wear plates positioned between said brackets and urged yieldingly towards one another, and a brake beam including heads and shoes for application to said wheels, said brake beam having an outward extension at its end slidingly received between said wear plates.

9. In a railway brake arrangement, wheels, a side frame provided with a pair of inwardly extending substantially parallel brackets providing a guideway therebetween, wear plates positioned between said brackets and yieldingly mounted thereon, a brake beam including heads and shoes for application to said wheels, said brake beam having outward extensions at its ends slidingly received between said wear plates.

10. In a railway brake beam, elongated structure and brake heads mounted on the end portions thereof, there being an extension on at least one end of said structure projecting outwardly beyond the brake head and including yielding means to oppose a truck part to support the adjacent beam end and providing for angular movement of the beam relative to the truck part.

11. In a railway brake arrangement, wheels, side frames provided with pairs of inwardly extending substantially parallel brackets providing guideways therebetween, adjacent faces of said brackets being recessed, springs in said recesses, wear plates positioned between said brackets and urged towards one another by said springs, there being means to limit movement of said wear plates, and a brake beam including heads and shoes for application to said wheels, said brake beam having outward extensions at its ends slidingly received between said wear plates.

12. In a railway brake arrangement, wheels, side frames provided with pairs of inwardly extending substantially parallel brackets forming guideways therebetween, a brake beam including heads and shoes for application to said wheels, said brake beam having outward extensions at its ends received in said guideways, yielding pads bonded to the faces of said extensions adjacent said brackets, and wear plates bonded to the faces of said pads adjacent said brackets for sliding engagement therewith.

13. In a railway brake arrangement, side frames having brackets projecting inwardly of the truck and forming brake beam supporting surfaces elongated lengthwise of the truck, a brake beam with bracket engaging structures at its ends, said structures projecting from the beam transversely of the beam length to provide elongated contacts with said bracket surfaces to stably support the beam as it moves to and from the truck wheels, said structure at least at one end of the beam being inclinable relative to the beam to accommodate relative inclination of the beam and side frames without shortening the elongated contacts.

14. In a railway brake arrangement, side frames, each having brackets projecting inwardly of the truck and spaced apart vertically to provide forwardly and downwardly facing elongated surfaces, a brake beam with bracket engaging structures at its ends projecting from the beam transversely of its length to provide elongated faces opposing said bracket surfaces to stably support the beam and to hold it against tilting about the beam axis as the beam is moved towards and away from the wheels to which it is applied, said structure at least at one end of the beam being inclinable about the beam longitudinal axis to maintain elongated contacts of the structures with said guide surfaces at both ends of the beam when the side frames tilt relative to each other about a transverse axis.

15. In a railway brake beam, end portions by which the beam may be supported, said portions including elements with elongated flat surfaces to provide extended contacts with supporting brackets on adjacent truck parts, at least one of said elements being inclinable to the major portion of the beam to accommodate inclination of the supporting brackets relative to the beam while maintaining the extended contacts between the elements and the supporting bracket.

16. In a railway brake beam, end portions by which the beam may be supported, said portions including elements with elongated downwardly and upwardly facing flat surfaces to provide extended contacts with supporting and guiding brackets on adjacent truck parts, at least one of said elements being inclinable to the major portion of the beam to accommodate inclination of the supporting brackets relative to the beam while maintaining the extended contacts between the elements and the supporting and guiding bracket.

SAMUEL J. WALKER.

REFERENCES CITED

The following references are of record in the file of this patent:

UNITED STATES PATENTS

| Number | Name | Date |
| --- | --- | --- |
| 2,254,513 | Busse | Sept. 2, 1941 |
| 2,254,514 | Busse | Sept. 2, 1941 |